E. PORTER.
MACHINE FOR BUFFING AND POLISHING AND REMOVING SCRATCHES.
APPLICATION FILED JULY 12, 1915.
1,161,412.
Patented Nov. 23, 1915.
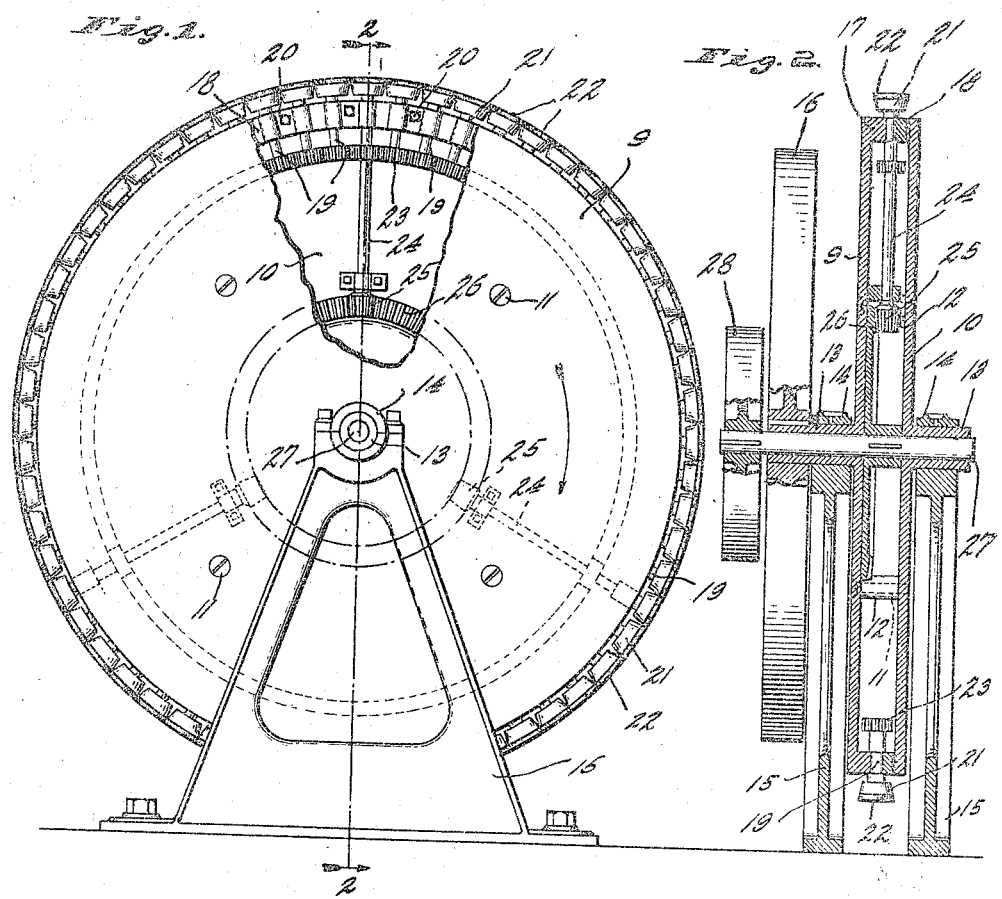
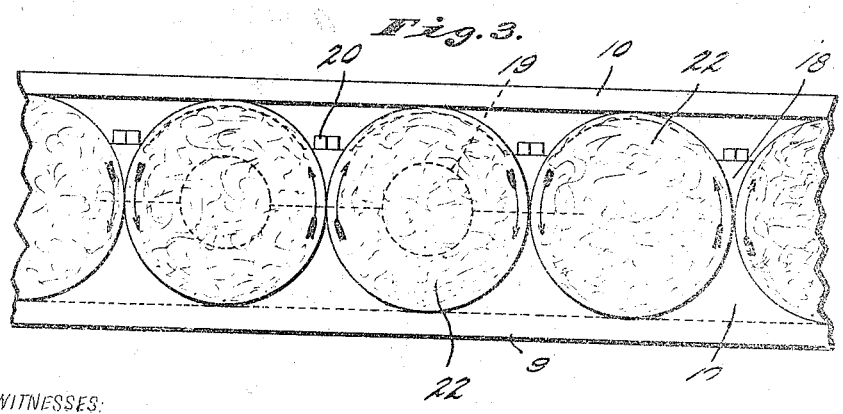

UNITED STATES PATENT OFFICE.

ENOS PORTER, OF SHELBYVILLE, INDIANA.

MACHINE FOR BUFFING AND POLISHING AND REMOVING SCRATCHES.

1,161,412.  Specification of Letters Patent.  Patented Nov. 23, 1915.

Application filed July 12, 1915. Serial No. 39,258.

*To all whom it may concern:*

Be it known that I, ENOS PORTER, a citizen of the United States, residing at Shelbyville, in the county of Shelby and State of Indiana, have invented a new and useful Machine for Buffing and Polishing and Removing Scratches, of which the following is a specification.

It is the object of my present invention to provide a machine for buffing and polishing and removing scratches rapidly and efficiently at any desired point, particularly on glass, without producing hair lines on the polished surface.

In carrying out my invention I provide a moving member which carries a series of rotating members alternate ones of which rotate in opposite directions, and mount on the faces of these rotating members some suitable buffing material. The glass or other material to be buffed or polished or to have scratches removed from it is held in the path of these rotating members so that as the moving member moves the rotating members are brought successively into engagement with the glass at the desired place so that the buffing material can act thereon. The rotation of alternate rotating buffing members in opposite directions effectively does the work, and prevents the formation of hair line scratches on the glass surface. Preferably the moving member is a wheel mounted to rotate, and the buffing members are arranged around the periphery of this wheel with their axes on radii of the wheel.

The accompanying drawing illustrates my invention.

Figure 1 is a side elevation of a buffing and polishing device embodying my invention; Fig. 2 is a section on the line 2—2 of Fig. 1; Fig. 3 is an enlarged partial development of the periphery of the device shown in Fig. 1.

The main wheel is shown as made of two spaced plates 9 and 10 fastened together by screws 11 passing through spacing bushings 12 to hold the two plates at the proper distance apart. These two plates are provided with integral hollow shaft portions 13, mounted in bearings 14 on a suitable supporting frame 15. One of the shaft portions 13 extends beyond the bearing (to the left in Fig. 2) and has fixed thereon a driving pulley 16. The plate 9 is provided at its periphery with an annular flange 17 axially projecting toward the plate 10, with which flange a ring 18 coöperates to provide bearings for an annular series of shafts 19 which extend radially of the main wheel. The ring 18 is clamped to the flange 17 in any suitable manner, as by screws 20, and both the ring and flange are radially grooved to provide the bearings just mentioned. The shafts 19 are shouldered at both ends of these bearings, so that they will not move radially of the wheel. At their outer ends the shafts 19 are provided with circular enlarged heads 21, the ends of which are faced with felt 22 or other suitable buffing material. The felt pieces 22 on adjacent shafts 19 preferably are just tangent, as is clear from Figs. 1 and 3. The inner end of each shaft 19 is provided with a gear 23, which meshes with a similar gear on each of the two adjacent shafts 19, so that the gears 23 form a complete annular series, and so that if any shaft 19 is rotated about its axis all the other shafts 19 are compelled to rotate also, alternate shafts rotating in opposite directions. Some of the shafts 19 are provided with radial inward extensions 24, Fig. 1 showing three of the shafts so provided. At their inner ends the extensions 24 are provided with bevel pinions 25, which mesh with a bevel gear 26 co-axial with the main wheel and located between the plates 9 and 10 and fixed on a shaft 27 which is journaled in the hollow shaft portions 13. On the projecting end of the shaft 27 a pulley 28 may be mounted.

In operation, the main wheel 9—10 is driven by a belt on the driving pulley 16. The shaft 27 may be driven by a belt on the pulley 28, or may be held stationary as the main wheel 9—10 rotates, as the shaft 27 and gear 26 are either held stationary or rotated at some different speed from the main wheel, the pinions 25 are caused to travel on the gear 26 to produce rotation of the various shafts 19 and of the circular felt portions 22 mounted on the outer ends of such shafts. As has already been stated, these felt portions 22 on alternate shafts 19 rotate in opposite directions, as indicated by the arrows in Fig. 3. The speed of rotation of the felt portions 22 depends upon the relative speed of the wheel 9—10 and of the gear 26, and may be controlled by varying the relative speeds of the pulleys 16 and 28. The piece of glass or other material which it is desired to buff or polish is held against the faces of the felt portions 22 so that as the wheel 9—10 rotates it is engaged successively by such felt portions, so that it is rubbed first in one direction and then in the other on account of the alternate rotation of the different felt pieces. This produces a buffing and polishing action which is very effective and which does not produce the hair lines which are so difficult to avoid in the ordinary buffing wheel. Any suitable abrasive material may be used on the felt. If a glass is scratched the scratch may be removed by holding the scratched portion against the felt pieces 22 which act to wear away the glass at the sides of such scratch to the desired depth to remove the scratch. All this can be done without the necessity for the continual movement of the glass by the operator such as is required by the ordinary buffing wheel in order to prevent hair line scratches, so that the buffing, polishing, and scratch-removing operations may be performed with equal efficiency by operators of less skill than that required for the ordinary buffing wheel. Moreover, the action is more rapid than that of the ordinary buffing wheel, and less laborious.

I claim as my invention:

1. A buffing and polishing machine, comprising a moving member, a series of shafts carried by said member and having their axes normal to the direction of movement, buffing material on the ends of such shafts, and means for producing rotation of alternate shafts in the series in opposite directions as such moving member is moved.

2. A buffing and polishing machine, comprising a moving member, a series of shafts carried by said member and having their axes normal to the direction of movement, buffing material on the ends of such shafts, and means for producing rotation of shafts in the series as such moving member is moved.

3. A buffing and polishing machine, comprising a rotary member, an annular series of shafts carried by said rotary member and having their axes extending substantially radially of said member, disks of buffing material mounted on the outer ends of such shafts, said disks of buffing material on adjacent shafts being substantially tangent, and gearing for producing rotation of alternate shafts in said series in opposite directions as said rotating member is rotated.

4. A buffing and polishing machine, comprising a rotary member, an annular series of shafts carried by said rotary member and having their axes extending substantially radially of said member, disks of buffing material mounted on the outer ends of such shafts, said disks of buffing material on adjacent shafts being substantially tangent, and gearing for producing rotation of shafts in said series as said rotating member is rotated.

5. A buffing and polishing machine, comprising a rotary member, an annular series of shafts carried by said rotary member and having their axes extending substantially radially of said member, disks of buffing material mounted on the outer ends of such shafts, and gearing for producing rotation of shafts in said series as said rotating member is rotated.

6. A buffing and polishing machine, comprising a rotary member, an annular series of shafts carried by said rotary member and having their axes extending substantially radially of said member, disks of buffing material mounted on the outer ends of such shafts, said disks of buffing material on adjacent shafts being substantially tangent, a gear concentric with said rotary member, of which gear the rotary member is independent in its rotation, and driving connections between said shafts and said gear.

7. A buffing and polishing machine, comprising a rotary member, an annular series of shafts carried by said rotary member and having their axes extending substantially radially of said member, disks of buffing material mounted on the outer ends of such shafts, a gear concentric with said rotary member, of which gear the rotary member is independent in its rotation, and driving connections between said shafts and said gear.

8. A buffing and polishing machine, comprising a rotary member, an annular series of shafts carried by said rotary member and having their axes extending substantially radially of said member, disks of buffing material mounted on the outer ends of such shafts, a gear concentric with said rotary member, of which gear the rotary member is independent in its rotation, driving connections between said shafts and said gear, and means for rotating said gear independently of said rotary member.

9. A buffing and polishing machine, comprising a rotary member, an annular series of shafts carried by said rotary member and having their axes extending substantially radially of said member, disks of buffing material mounted on the outer ends of such shafts, a gear on the inner end of each of said shafts connecting with a similar gear on the inner ends of other shafts of the series, a bevel gear concentric with said rotary member but of which the rotary member is independent in its rotation, and a bevel pinion on one of said series of shafts, said bevel pinion meshing with said bevel gear.

In witness whereof, I have hereunto set my hand at Indianapolis, Indiana, this eighth day of July, A. D. one thousand nine hundred and fifteen.

ENOS PORTER.